United States Patent [19]

Wismer et al.

[11] 3,943,080

[45] Mar. 9, 1976

[54] ORGANIC FLATTING AGENTS AND METHOD OF PREPARATION

[75] Inventors: Marco Wismer, Gibsonia; Karl F. Schimmel, Verona; Rodger G. Temple, Gibsonia, all of Pa.

[73] Assignee: PPG Industries, Inc., Pittsburgh, Pa.

[22] Filed: Aug. 1, 1974

[21] Appl. No.: 493,818

Related U.S. Application Data

[63] Continuation of Ser. No. 347,604, April 3, 1973, Pat. No. 3,850,868.

[52] U.S. Cl. .................. 260/20; 260/14; 260/15; 260/22 SQ; 260/22 TN; 260/29.3; 260/29.4 UA; 260/838; 260/840; 260/844; 260/848; 260/849; 260/851; 260/854
[51] Int. Cl.² .... C09D 3/52; C09D 3/56; C09D 3/66
[58] Field of Search ....... 260/20, 14, 15; 117/161 L, 117/161 LN

[56] References Cited
UNITED STATES PATENTS

| | | | |
|---|---|---|---|
| 3,615,792 | 10/1971 | Keene | 260/14 |
| 3,627,713 | 12/1971 | Maruta et al. | 260/15 |
| 3,634,347 | 1/1972 | Kao | 260/15 |
| 3,703,487 | 11/1972 | Green et al. | 260/2.5 FP |
| 3,761,433 | 9/1973 | High | 260/22 A |
| 3,830,782 | 8/1974 | Kempter et al. | 260/67.6 R |

FOREIGN PATENTS OR APPLICATIONS 855,768   11/1970   Canada ..................... 260/29.4 R

OTHER PUBLICATIONS

Chatfield, Varnish Constituents, London, Leonard Hill Limited, 1953, pp. 345–353.
Singer, Fundamentals of Paint, Varnish, and Lacquer Technology, St. Louis, Mo., American Paint Journal Company, 1957, pp. 35–44.

*Primary Examiner*—Ronald W. Griffin
*Attorney, Agent, or Firm*—Frank J. Troy

[57] ABSTRACT

Solid organic inert flatting agents are prepared by reacting urea or phenol and formaldehyde in a basic aqueous medium to provide a prepolymer solution, then blending the prepolymer in the presence of a protective colloid-forming material, subsequently acidifying the basic prepolymer solution so that particles are formed and precipitated in the presence of a colloid-forming material, as spheroidal beads, and finally collecting and, if desired, drying the urea or phenol formaldehyde particulate beads. These beads have a high flatting efficiency and may be incorporated in resinous vehicles to provide compositions that produce low gloss coatings of desirable properties.

4 Claims, No Drawings

ORGANIC FLATTING AGENTS AND METHOD OF PREPARATION

This is a division of application Ser. No. 347,604, filed Apr. 3, 1973, now U.S. Pat. No. 3,850,868, issued Nov. 26, 1974.

BACKGROUND OF THE INVENTION

Certain processes for the preparation of urea or phenol and formaldehyde beads have been known in the art. For example, Canadian Patent No. 909,433 is directed to a process of producing a phenol-formaldehyde resin which comprised reacting from 0.6 to 1 mole of formaldehyde with each mole of para-substituted phenol in the presence of an effective amount of an acidic catalyst and a hydrophobic organic solvent capable of forming an azeotrope with water, dissolving the remaining polymer in an aqueous alkali solution which separates any remaining organic solvent from the solution, and then adding an acid to the solution to precipitate the polymer. The polymer provided here must be crushed in order to make the composition a useful powder.

U.S. Pat. No. 3,516,941 is directed to microcapsules which comprise an organic liquid film enclosed by a strong, impermeable shell of urea-formaldehyde polymer. These microcapsules are produced by dispersing and maintaining the film material as finely divided particles in an aqueous, water-soluble urea-formaldehyde precondensate solution substantially free of carboxymethyl cellulose and other wetting agents, while polymerizing the free condensate by acid catalyst for at least one hour in a pH range of about 1 to about 5.

Canadian Patent No. 887,694 relates to certain solid inert flatting or texturing agents consisting pf particulate solids with particle diameters from 1 to 700 microns insoluble in organic media and comprising greater than 75 percent but less than 90 percent by weight of a pigment dispersed in a polymeric binder, further characterized in that the volume concentration of the pigment in the polymeric binder is less than 82 percent and the pigment has an oil absorption of 90 maximum. It will be noted that these agents require the inclusion of a pigment therein.

Canadian Patent No. 855,768 is directed to a pigment extender composition comprising fully polymerized urea-formaldehyde particles having dispersed therein 15 to 35 percent by volume of $TiO_2$ particles, the mole ratio of the urea to formaldehyde in these particles being substantially one to one, and the particles ranging in size from greater than one micron up to 30 microns, preferably from 2 to 20 microns.

DESCRIPTION OF THE INVENTION

It has been discovered that solid organic inert flatting particulate beads can be produced by polymerizing urea or phenol and formaldehyde in the following manner:

A. reacting urea or phenol and formaldehyde in a basic aqueous medium to form a prepolymer;

B. blending the prepolymer with a protective colloid-forming material;

C. polymerizing the prepolymer by acidifying the mixture thus formed under agitation, thereby forming beads, then agglomerating said beads to the desired gross particle size;

D. collecting the beads; and, if desired,

E. drying said particulate beads.

The particulate beads herein may be prepared by acidifying, while under agitation, an aqueous mixture of urea or phenol and formaldehyde in the presence of a protective colloid forming material. The mixture is then polymerized so that particulate beads are formed in the presence of this protective colloid while the mixture is under agitation. The particulate beads are agglomerated to a desired gross particle size, collected, and, if desired, dried.

These particulate beads perpared herein can be readily incorporated in a wide variety of resinous vehicle compositions in order to provide a desired flatting effect or texturing effect. Flatting may simply be defined as the ability to diffuse reflected light.

The flatting particulate beads of the present invention have numerous advantages. For example, they can be prepared inexpensively in an aqueous medium which is safe and non-toxic. The beads as prepared can have a substantially uniform particle size distribution. When the particulate beads herein are incorporated into coating compositions, films made therefrom have excellent burnish resistance. Since these particulate beads can be used to control low and high angle gloss, they can readily replace or substitute for more expensive flatting agents which are available commercially.

The particulate beads herein as well as having excellent flatting efficiency can be employed as texturing agents. Further, these beads are desirable in formulating high solids coating compositions which are extremely useful since they demand little resin to wet their surface, hence the usual high viscosity problems are not encountered while still maintaining good flatting efficiency. It is also noted that the particulate beads herein have good shear stability and when incorporated in coating compositions they do not reduce the chemical or stain resistance.

The flatting particulate beads herein are prepared by a three-step procedure. First, the prepolymer is synthesized; secondly, the polymerization step is carried out and finally the particulate beads are isolated and dried.

In the prepolymer synthesis, the urea or phenol is reacted with the formaldehyde to produce a water-soluble, multifunctional prepolymer.

In preparing the multifunctional prepolymer, it is understood that urea, as defined herein, includes substituted urea such as monomethylol urea, methylene urea thiourea, ethyleneurea, N,N-dimethyl ethyleneurea, acetylurea, malonylurea, N,N-diethylurea, and the like.

Similarly, phenol, as defined herein, includes ortha, meta and para-substituted phenols. Examples of ortha-substituted phenols include o-cresol, o-fluorophenol, o-chlorophenol, o-bromophenol, o-iodophenol, o-aminophenol, o-nitrophenol and the like.

Examples of meta-substituted phenols include m-cresol, m-fluorophenol, m-clorophenol m-bromophenol, m-iodophenol, m-aminophenol, m-nitrophenol and the like.

Examples of para-substituted phenols, which are preferred, include p-alkylphenols such as p-cresol, p-ethylphenol, p-tert.-butylphenol, p-tert.-amylphenol, cyclohexylphenol, p-heptylphenol, p-octylphenol, and p-nonylphenol; p-arylphenols such as p-phenylphenol; and p-halogenated phenols such as p-chlorophenol, p-bromophenol, and the like.

It is also understood that mixtures of urea and/or phenol may likewise be employed.

The phenols or ureas are reacted with the formaldehyde under alkaline conditions at a temperature of from about 70° C. to about 85° C. Although it is preferred to carry this reaction out in an aqueous medium, the prepolymer may be prepared, if desired, in an organic medium, such as in alcohol, toluene, xylene, butyl Cellosolve, mineral spirits, or the like.

The formaldehyde herein is preferably employed as a solution, such as formalin (37 percent in water); however, solutions of formaldehyde up to about 50 percent or more in water may be employed. Likewise, it is noted that the formaldehyde may also be employed as an alcohol solution. In some instances, the formaldehyde may be 100 percent pure, e.g., paraformaldehyde or trioxane, but essentially any concentration may be utilized.

When a phenol is reacted with formaldehyde, the molar ratio may be varied somewhat, but the most suitable ratios include a phenol-to-formaldehyde ratio of from about 1-to-1 to about 1-to-3 and the preferred ratio is about 1-to-3. When urea is reacted with formaldehyde, a ratio of formaldehyde to urea of from about 1-to-1 to 0.5-to-3 is quite suitable, and the preferred ratio is from about 0.5-to-1 to about 1.5-to-1.

The urea or phenol and formaldehyde are usually less than about 35 percent of the total weight of the prepolymer solution and, in most instances, it is preferred that the solution be less than about 24 percent weight solids content.

As mentioned hereinabove, the prepolymer is prepared under alkaline conditions. The alkaline conditions are usually provided by employing a basic compound in any amount sufficient to provide a pH range of between about 8–10. In order to provide a pH within this range, it is usually necessary to employ up to about one percent by weight, based on the total weight of the urea or phenol and formaldehyde, of the basic compound.

The basic compounds that may be employed herein include inorganic bases such as metal hydroxides, especially potassium hydroxide, and ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, m-methyl-butylamine, triethylamine, tributylamine, methyldiethylamine, dimethylbutylamine and the like; cyclic amines such as morpholine, pyrrolidine, piperidine; diamines, such as hydrazine, methylhydrazine, 2,3-toluene diamine, ethyl diamine and piperazine and substituted amines such as hydroxylamine, ethanolamine, diethanolamine, butanolamine, hexanolamine and methyl-diethanolamine, octanolamine, diglycolamine and other polyglycol amines, triethanolamine and methylethanolamine, n-aminoethanolamine and methyldiethanolamine and polyamines such as diethylene triamine, triethylene tetramine, hexamethylene tetramine.

As pointed out hereinabove, the prepolymer can be prepared by reacting urea or phenol and formaldehyde in a basic aqueous medium.

The prepolymer components are generally heated to a temperature of from about 70° to 150° C. for a time period of from about 15 minutes to about 4 hours, but it is preferred that the time period be from about 1 to about 2 hours while under continual agitation. The preferred temperature range is from about 70° C. to about 75° C.

When the components reacted are urea and formaldehyde, a mixture of methylolureas are provided which are water-soluble and multifunctional. Such multifunctional prepolymers are then reduced with water or other suitable reducers containing a hydroxyfunctional protective colloid-forming material. The prepolymer solution is reduced to a solids content of from about 5 to about 21 percent and preferably from about 5 to about 17 percent.

The preparation of the prepolymer and the polymerization step are preferably conducted in the presence of a hydroxyfunctional protective colloid-forming material. The hydroxyfunctional protective colloid-forming material is usually present in an amount up to about 5 percent by weight, based on total weight of the urea or phenol and formaldehyde; however, the preferred amount is from about 0.5 percent to about 3.5 percent by weight.

Hydroxyfunctional protective colloids that may be employed herein include polyoxyethylene alkylphenols, such as polyoxyethylene nonylphenols, polyoxyethylene actylphenol, polyoxyethylene dodecylphenols and alkylaryl hydroxy compounds; polyoxyethylene alcohols such as prepared from ethylene oxide and an alcohol such as n-octanol, n-decanol, n-dodecanol, n-tetradecanol, n-octadecanol, 5-ethylnonanol; 2,5,8-trimethylnonanol, 4,2-methyl-7-ethylundecanol-4; 3,9-diethyltridecanol-6, stearyl, lauryloxotridecanol, hydroabietyl, oleyl, cetyl cocoalcohol, and the like; polyol protective colloids such as those which contain a residue of polyhydroxycompound such as the hydrophilic moiety, for example, an ester in combination with hydrophobic groups derived from fatty acids. The polyol starting materials include straight-chain polyhydroxy compounds with 2 to 6 hydroxyl groups per chain, such as pentaerythritol, polyglycerols, carbohydrates, and polyoxyalkylene derivatives of triol and higher polyol fatty acid esters. One of the simplest protective colloid forming materials are the monoesters of ethylene glycol and propylene. Also useful are partial esters of glycerol, for example, partial fatty acid esters of glycerol. Polyglycerol esters such as those prepared by the esterification of polyglycerols with fatty acids may be employed.

Other useful materials include tetritol and penitol esters, such as those prepared by direct esterification of erythritol with one equivalent of palmitic or stearic acid, which provides mixture of mono-, di-, tri- and tetraesters.

Likewise, polyoxyalkylene polyol esters are useful. These may be manufactured by the reaction of olefin oxides with partial fatty esters of polyols, for example, the reaction of glycerol monooleate with ethylene oxide to form a polyoxyethylene monoglyceride and, similarly, polyoxyethylene derivatives of pentaerythritol monostearate, which can be obtained by reaction with ethylene oxide. Some of the commercially available hydroxy-containing materials that may be employed to function as a protective colloid herein include ethylene glycol and propylene glycol esters, such as ethylene glycol monolaurate, ethylene glycol monopalmitate, ethylene glycol monostearate, propylene glycol monolaurate, propylene glycol monopalmitate, 1-propylene glycol monostearate, 2-propylene glycol monostearate, and the like;

Glycerol esters such as 1-monolaurin, 2-monolaurin, 1,2-dilaurin, 1,3-dilaurin, 1-monopalmitan, 2-monopalmitan, 1-monostearin, 2-monostearin, 1,2-distearin, 1,3-distearin, 1-monoolein, 2-monoolein, 1,3-diolein, mono- and diglycerides from glycerolysis of edible fats, 40-44 percent α-monoglyceride, mono- and diglycerides from glycerolysis of edible fats, 52-56 percent α-monoglyceride, mono- and diglycerides from glycerolysis of edible fats, 54-58 percent α-monoglyceride, 1-aceto-3-stearin, 1,2-diaceto-3-stearin, 1-mono-0-palmitoyl lactin, 1-0-palmitoyl lactyl-2,3-dilactin;

Polyglycerol esters such as trioxycerol monostearate, hexaglycerol monostearate, decaglycerol monooleate, decaglycerol monolaurate, decaglycerol monopalmitate, decaglycerol monostearate, decaglycerol tristearate, decaglycerol monooleat, decaglycerol tetraoleate;

Hexitol esters such as sorbitol monolaurate, mannitol monolaurate, sorbitol dilaurate, mannitol dilaurate, mannitol-3,4-dilaurate, sorbitol monostearate;

Sorbitan esters such as sorbitan monolaurate, sorbitan monopalmitate, sorbitan monostearate, sorbitan tristearate, sorbitan monooleate, sorbitan trioleate;

Methyl glucoside esters such as methyl glucoside monolaurate, methyl glucoside dilaurate, methyl glucoside-6-monopalmitate, methyl glucoside monostearate, methyl glucoside distearate, methyl glucoside monooleate, methyl glucoside dioleate;

Sucrose esters such as sucrose monolaurate, sucrose monopalmitate, sucrose monostearate, sucrose monooleate, sucrose dioleate;

Polyoxyethylene sorbitan esters such as polyoxyethylene sorbitan monolaurate, polyoxyethylene sorbitan monolaurate, polyoxyethylene sorbitan monopalmitate, polyoxyethylene sorbitan monostearate, polyoxyethylene monostearate, polyoxyethylene sorbitan monooleate, polyoxyethylene sorbitan trioleate; and Polyoxyalkylene sucrose esters such as polyoxyethylene sucrose dipalmitate, polyoxyethylene sucrose distearate, polyoxyethylene sucrose dioleate, polyoxypropylene sucrose monolaurate, polyoxypropylene sucrose monopalmitate, polyoxypropylene sucrose monostearate, polyoxypropylene sucrose distearate, polyoxypropylene sucrose monooleate, polyoxypropylene sucrose dioleate. A particularly preferred hydroxy-containing material is polyvinyl alcohol which can readily be employed as a suitable protective colloid for purposes of the present invention.

Also useful as protective colloids are wax-like materials such as those sold under the trade name "Carbowax", for example, Carbowax 6000 and polyethylene glycol compound (Union Carbide's 20M). Preferred are those compounds having a molecular weight range of from about 6,000 to 20,000. These materials will melt from the heat of polymerization and provide the desired result. Further, these materials are usually present in about the same proportions as the hydroxyfunctional material discussed above. Also, it is noted that in some instances a protective colloid is not necessary when urea and formaldehyde are being utilized to prepare the beads.

Generally, after the prepolymer is prepared, it is blended with the protective colloid-forming material described hereinabove. However, if desired, the protective colloid-forming material may be charged initially with the urea or phenol and formaldehyde and thus be present during the formation of the multifunctional prepolymer.

Next, the polymerization is conducted by acidifying the multifunctional prepolymer solution with an acid catalyst. The acid catalyst herein is usually employed in the form of a solution which is added to the multifunctional prepolymer solution, preferably over a period of time (e.g., up to about 90 minutes or more) while polymerizing solution is continually agitated under high shear. Generally, however, it is preferred that the acid catalyst is added over a 5-minute period.

The acids which can be employed include inorganic acids, such as perchloric, persulfuric, sulfuric, phosphoric, picric, pyrosulfuric, paratoluene sulfonic, chloric, boric, hydrochloric and hydrofluoric acids, and the like, as well as organic acids, such as formic, acetic, propionic, butyric, crotonic, chloroacetic, glycolic, lactic, malonic, adipic, succinic, maleic, malic, citric, tartaric acids, and the like.

For the purpose of the present invention, the preferred acids are sulfuric acid and citric acid.

The amount of acid catalyst employed is not critical and depends on the acid utilized, for example, if sulfuric acid is used, the amount employed is usually from about 0.05 to 1.5 percent, and preferably from about 0.1 to about 0.6 percent, based on the weight of the urea or phenol and formaldehyde employed. If citric acid is employed, from about 0.1 to about 10.0 percent by weight may be employed, with about 1.0 to about 5.0 percent by weight preferred.

The polymerization step is carried out under high shear agitation and may be carried out in two hours or less. However, in some instances 5 hours or more may be employed in order to obtain high conversion yields.

Generally, the yield is at least 50 percent, however, in some instances yields as high as 85 percent or more can be obtained, depending on monomer concentration, reaction conditions and the amount of catalyst employed.

In some instances, near the end of the polymerization procedure it may be desirable to add a small amount of the basic compound described hereinabove to inhibit further polymerization. The amount of such basic compound will depend on the acidity of the solution, but usually an amount sufficient to change the pH to 7 or greater is used.

During the polymerization step, the solid particulate beads of the present invention are precipitated, in the presence of a protective colloid, out of the acidic solution. The particulate beads produced generally have a size of about 1 micron or less, although they may be obtained in clumps or agglomerates which have a micron size of from about one to about 50 microns. However, the preferred size of these clumps of particulate beads is from about 2 to about 20 microns. The most efficient flatting is provided when the particulate beads are present in the form of agglomerates.

The size and degree of agglomerates can be controlled by a number of techniques, such as the peripheral speed of the agitator, the blade size in relation to the diameter of the reactor and the depth of which the agitator blade is set in the polymerizable solution.

Generally, it has been noted that as the shear increases, the bead size decreases. The smallest beads are made by employing a large agitator blade (Cowles blade) which is operated at high speeds.

It has been found that good results are provided when the agitator blade has a diameter of about one-third the size of the reactor diameter and is operated at a pheripheral speed of about 2500 feet per minute.

It is also noted that a more efficient shear is provided when the agitator blade is located near the bottom of the reactor. And it is understood that the agitator blades employed herein are selected from a design which, when operated, will produce a high shearing action. High shearing action is preferred for purposes of this invention.

Conventional adjuvants may be added prior to or during the polymerization step in order to incorporate desirable properties into the resulting beads. These include, for example, titanium dioxide, encapsulated aluminum, silica, lead silico chromate, carbon black, talc, barium sulfate, and the like, as well as combinations of these and similar pigments. Color pigments such as cadmium red, cadmium yellow, phthalocyanine blue, phthalocyanine green, chrome green, toluidine red, hydrated iron oxide, and the like may be included if desired. Also, generally incorporated into the pigment is a dispersing agent, a surface-active agent or adhesion enhancing agents. The surface-active agent can be non-ionic, cationic or anionic or a combination thereof. Dispersing agents such as ethoxylated alkyl phenyl phosphate can be employed. Adhesion enhancing agents such as cellulose acetate butyrate may be added in sufficient amounts to provide the required adhesion.

Other components which may be included in these coating compositions, if desired, include, for example, melting agents, flow agents, fungicide, antioxidants, and the like.

The final particulate beads, if desired, can be isolated or collected and dried. It will be understood that the beads herein may readily be employed in slurry form by adding the bead slurry directly to a composition to provide a flatting effect when the composition containing the bead slurry is subsequently applied to a substrate. For example, an aqueous bead slurry can be added directly to a latex coating composition to produce the desired flatting.

The beads can be segregated by conventional means well known in the art, such as filtration, spray drying, decanting, centrifuging, suction pressure, filter press and the like.

During the separation procedure, other liquids may be added to alleviate the tendency of the particles to pack or agglomerate exclusively; such liquids include, for example, acetone, ethyl Cellosolve, hot water (50°–60° C.), and the like. Also, the beads can be collected in a concentrated slurry form and subsequently utilized in slurry form. This prevents possible agglomeration.

The particulate beads may be dried by any conventional means, such as heating in an oven or hot room. Large circulating hot air ovens designed for removing water and other media are often used.

The particulate beads described and defined hereinabove may be utilized as flatting or texturing agents in film-forming materials which may then be employed as coating compositions and the like.

Any conventional film-forming materials may be used with the beads of this invention. Such materials include thermoplastic, thermosetting, synthetic and natural polymers.

Examples of film-forming materials useful in this invention include those prepared from cellulose derivatives, e.g., ethyl cellulose, nitrocellulose, cellulose acetate, cellulose propionate and cellulose acetate butyrate; acrylic resins, e.g., homopolymers and copolymers with each other or with other momomers of acrylic or methacrylic acid and their derivatives, such as methyl acetate, methyl methacrylate, ethyl acrylate, ethyl methacrylate, butyl acrylate, butyl methacrylate, acyrlamide, acrylonitrile, etc.; polyolefins, e.g., polyethylene and polypropylene; polyamides, such as nylon; polycarbonates; polystyrene; copolymers of styrene and other vinyl monomers such as homopolymers and copolymers of vinyl acetate, vinyl chloride and vinyl butyral; homopolymers and copolymers of dienes such as polybutadiene, butadiene-styrene copolymers, and butadiene-acrylonitrile copolymers.

Condensation polymers may also be used, such as alkyd resins, which are obtained by the condensation of a polyhydric alcohol and a polycarboxylic acid. Examples of polycarboxylic acids which may be used to form the alkyd resin include phthalic acid, succinic acid, adipic acid, maleic acid, isophthalic acid, terephthalic acid, etc., which are reacted with polyhydric alcohols such as ethylene glycol, propylene glycol, glycerine, sorbitol, pentaerythritol, and the like. Epoxy resins may also have the particulate beads herein incorporated in order to produce a flat coating composition. Epoxy resins include the condensation products of bisphenol and epichlorohydrin, epoxidized oils, the glycidyl ethers of glycerol, epoxylated "novolac" resins, etc. Phenolic resins, such as those obtained by the reaction of phenol and formaldehyde, may also be used, as can aminoplast resins derived from the reaction of a compound containing a plurality of —$NH_2$ groups (e.g., urea, melamine, guanamine or benzoguanamine) with an aldehyde or a substance acting as an aldehyde (e.g., formaldehyde benzaldehyde, paraformaldehyde). In preparing aminoplasts, the aldehyde or its equivalent is usually dissolved in an alkanol, such as butyl alcohol, and at least a part of the N-methylol groups on the aminoplast are converted into -N-oxyalkyl groups.

A preferred group of film-forming materials which may be used in the practice of this invention are carboxylic acid amide interpolymers of the type disclosed in U.S. Pat. Nos. 3,037,963; 3,118,853; 2,870,116; and 2,870,117. These interpolymers are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol.

Alternatively, such interpolymers can be produced by first reacting the unsaturated amide with an aldehyde and, if desired, an alcohol, to form an N-alkylol or an N-alkoxyalkyl-substituted amide. The N-substituted amide then is interpolymerized with the other monomer or momomers, thereby producing interpolymers having the aforesaid recurrent groups without the need for further reaction. Such a method utilizing N-alkoxyalkyl-substituted amides is described in U.S. Pat. No. 3,079,434.

Advantageous properties are often obtainable by employing mixtures of the above amide interpolymer resins with other resinous materials, such as many of those mentioned herein. For example, nitrocellulose, polyethylene, alkyd resins, epoxy resins, aminoplast resins, and others can be utilized for this purpose.

Another preferred group of film-forming materials which may be used in the practice of this invention consists of interpolymers of hydroxyl-containing esters of unsaturated acids with at least one other polymerizable ethylenically unsaturated monomer. In many cases, more than one hydroxyalkyl ester is included in the interpolymer, and generally several monomers in addition to the hydroxyalkyl ester or esters are employed. Preferred hydroxyalkyl esters are acrylic acid and methacrylic acid esters of ethylene glycol and 1,2-propylene glycol, i.e., hydroxyethyl acrylate and methacrylate, and hydroxypropyl acrylate and methacrylate, but there may be employed similar esters of other unsaturated acids, for example, ethacrylic acid, crotonic acid, and the like.

The monomer or monomers with which the hydroxyalkyl ester is interpolymerized can be any ethylenic compound copolymerizable with the ester. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, butadiene-1,3, 2-chlorobutene, alpha-methyl styrene, 2-chlorobutadiene-1,3 vinyl butyrate, vinyl acetate, dimethyl maleate, divinyl benzene, diallyl itaconate, and the like. Preferred comonomers are the alkyl esters of ethylenically unsaturated carboxylic acids, vinylaromatic hydrocarbons, ethylenically unsaturated nitriles, and ethylenically unsaturated carboxylic acids. The specific comonomers must often employed are methyl methacrylate, ethyl acrylate, styrene, vinyl toluene, acrylonitrile, methacrylonitrile, methacrylic acid, acrylic acid, 2-ethylhexyl acrylate, butyl acrylate, butyl methacrylate, and lauryl methacrylate.

Films are usually produced from the above interpolymers of hydroxyalkyl esters by crosslinking these interpolymers with another material containing functional groups reactive with the hydroxyl group of the interpolymer, such as, for example, polyisocyanates and aminoplast resins.

It is understood that the film-forming material described above may have incorporated therein conventional adjuvants such as solvents, pigments, dispersing agents, surface-active agents, adhesion-enhancing agents, melting agents, flow agents, fungicide, anti-oxidants and the like.

Set forth below are several specific embodiments of the preparation of the particulate beads of this invention and their utility when incorporated in a film-forming material. These embodiments are illustrative and are not to be construed as limiting the invention. All parts and percentages are based upon non-volatile solids content and are by weight unless otherwise indicated.

EXAMPLE I

In this example particles comprising fully polymerized urea formaldehyde resin beads were prepared as follows:

A prepolymer was prepared by charging the components below into an open container:

|  | Parts by Weight |
| --- | --- |
| Urea | 27.92 |
| Formaldehyde (37% solution in water) | 55.85 |
| Triethanolamine | 0.31 |

These components were heated to 70°-75° C. and maintained there for an hour, then the resulting prepolymer was reduced with 118.87 parts of water. To this composition 0.66 parts of polyvinyl alcohol (protective colloid) were added and this system was stirred for about 5 minutes. A solution of 77.50 parts of water and 0.96 parts of sulfuric acid was added and the acidified system was polymerized by stirring with a Cowles blade operating at about 1200 rpm for about 2 hours. In order to terminate continued polymerization and further agglomeration, 1.93 parts of ethanolamine were added. A suction filter was employed to isolate the beads and drying was carried out by placing the agglomerated beads in drying pans which were placed in ovens and heated to about 150° F. The dried agglomerates could easily be pulverized by subjecting such agglomerates to a pressure such as that applied by a finger and thumb. A 61 percent yield of beads was obtained.

EXAMPLE II

In this example, polymerized urea formaldehyde resin beads were perpared in a manner which was similar to that of Example I except the procedure employed bypassed the prepolymer formation. The procedure employed was as follows:

The following components were charged into a clean container:

|  | Parts by Weight |
| --- | --- |
| Water | 194.73 |
| Formaldehyde (37% solution in water) | 22.70 |
| Urea | 18.20 |
| Polyvinyl alcohol (1.31 parts in 30 parts water) | 31.33 |

This composition was subjected to high shear by utilizing a Cowles blade having a diameter of one-third that of the container and which was operating at a speed of 1200 r.p.m. This high speed shearing action was permitted to continue for about 15 minutes. Then after 0.96 part of sulfuric acid was added to the system, it was stirred as described above for two hours during which the polymerization took place. As in Example I, 1.93 parts of ethanolamine were added in order to terminate additional polymerization and further undesirable agglomeration. The polymerized beads were filtered and dried as in Example I.

EXAMPLE III

This example is similar to that of Example I except that in this example citric acid instead of sulfuric acid was employed as a catalyst. A prepolymer was prepared from the following components which were charged into a container.

|  | Parts by Weight |
| --- | --- |
| Formaldehyde (37% solution in water) | 1952.0 |
| Urea | 960.0 |
| Triethanolamine | 9.6 |

These components were heated to about 75° C. while under continual agitation to produce methylolurea. The prepolymer was reduced with 4000 parts of water and then 1225 parts of citric acid (10% solution in water) were added to 2490 parts of the prepolymer solution over a 78 minute period while the solution was agitated by a stirring apparatus having a blade one-half of the diameter of the container employed and operating at a speed of about 4400 r.p.m. The polymerized resin beads were then further reduced by the addition of 2000 parts of water, which were added over about a 42 minute period. The polymerized polymer solution was permitted to continue under agitation for about 5 hours after the acid solution was added to it.

The agglomerated resin beads were isolated and dried in a manner set forth hereinabove.

EXAMPLE IV

In this example 700 parts of a prepolymer as prepared in Example III were polymerized in the presence of 140 parts of a citric acid solution (10 percent in water) and 2600 parts water in a manner similar to that of Example III. The beads were isolated by a suction filter means and then placed in drying pans which were then placed in an oven overnight at a temperature of about 110° C. Spheroidal beads, suitable for use as a flatting agent, were obtained in a yield of 66 percent.

EXAMPLE V

This example was similar to that of Example IV except that herein air was employed as an additional means of agitation. This air agitation was provided for by employing a container for polymerization which had an air inlet at its base so that the air could be utilized in a most effective manner. A conversion of about 63.2 percent was obtained.

EXAMPLE VI

In this example particulate beads were formed by polymerizing a phenol-formaldehyde prepolymer.

The prepolymer was prepared by blending together 200 parts of formaldehyde (35 percent solution in water), 62 parts of phenol, and a solution comprising 27 parts of NaOH in 100 parts of water. This mixture was heated (85°–95° C.) until the condensation product began to precipitate, then a solution comprising 100 parts of water, 4 parts polyvinyl alcohol and 90 parts benzyl chloride was added and the system was heated for about one hour. The benzyl chloride was employed to accelerate the reaction as the prepolymer was converted to a benzyl ether form.

Subsequently, the system was acidified with sulfuric acid under high shear agitation. The system was maintained at a temperature of about 5 hours.

On cooling, a sludge precipitate settled out of the aqueous phase; however, when the aqueous phase was decanted and acetone was added to the sludge, a fine powder was produced. A 64 percent yield of beads was obtained.

Examples VII to XI, below, demonstrate the excellent flatting efficiency of the urea-formaldehyde beads prepared hereinabove. Examples VII-XI were compared with the following base composition to evaluate the flatting effect of the particulate beads herein versus that of a conventional base composition devoid of a flatting agent.

| Base Composition | Parts by Weight |
|---|---|
| Linseed alkyd resin modified with toluene diisocyanate (46.4% solids) | 50.0 |
| Mineral spirit | 30.6 |
| Lead tallate drier | 4.2 |
| Body and suspension agent (Bentone 34) | 10.0 |

After dispersing the above components, the following reducer was added:

| | Parts by Weight |
|---|---|
| Mineral spirits | 30.0 |
| Alkyd resin (above) | 563.0 |
| Manganese tallate drier | 1.5 |
| Cobalt tallate drier | 1.5 |
| Anti-skinning agent | 2.0 |
| Ethanol | 6.5 |
| Phenyl mercuric oleate | 1.75 |
| Mineral spirits | 47.28 |

EXAMPLE VII

| | Parts by Weight |
|---|---|
| Base composition (above) | 365.0 |
| Particulate beads (as in Example III) | 6.2 |

EXAMPLE VIII

| | Parts by Weight |
|---|---|
| Base composition (above) | 365.0 |
| Silica aerogel extender | 6.2 |
| Particulate beads (as in Example III) | 3.1 |

EXAMPLE IX

| | Parts by Weight |
|---|---|
| Base composition (above) | 358.0 |
| Particulate beads (as in Example III) | 12.0 |

EXAMPLE X

| | Parts by Weight |
|---|---|
| Base composition (above) | 358.0 |
| Particulate beads (as in Example IV) | 12.5 |

EXAMPLE XI

| | Parts by Weight |
|---|---|
| Base composition (above) | 358.0 |
| Particulate beads (as in Example IV) | 12.0 |

In order to provide uniform particulate size, all of the above examples were ground in a conventional sand mill employing zircoa media to provide a Hegman reading 6–7.

Each of the above compositions was applied to a steel panel at two different thicknesses and, after allowing to air dry, their gloss was measured on a 60 degree gloss meter and a 20 degree gloss meter, respectively. The results are set forth in Table I below:

TABLE I

| | Thickness (3.0 mils) | | Thickness (2.0 mils) | |
|---|---|---|---|---|
| Example | 60° Gloss Meter | 20° Gloss Meter | 60° Gloss Meter | 20° Gloss Meter |
| Base Comp. (above) | 94.0° | 74.0° | — | — |

TABLE I-continued

| Example | Thickness (3.0 mils) 60° Gloss Meter | Thickness (3.0 mils) 20° Gloss Meter | Thickness (2.0 mils) 60° Gloss Meter | Thickness (2.0 mils) 20° Gloss Meter |
|---|---|---|---|---|
| VI | 70.0° | 52.0° | 78.0° | 44.0° |
| VII | 55.0° | 15.0° | 63.0° | 12.0° |
| VIII | 71.0° | 33.0° | 70.0° | 31.0° |
| IX | 68.0° | 26.0° | 52.0° | 14.0° |
| X | 65.0° | 24.0° | 36.0° | 6.0° |

The data of Table I shows that the particulate beads used in the examples have a substantial flatting effect. This is exemplified by the gloss reading of these Examples with respect to the base composition. Also, it will be noted that the particulate beads can be used effectively in combination with a conventional flatting agent such as the silica extender set forth in Example VIII.

EXAMPLE XII

This is an example of a coating composition, which has incorporated therein pigments in addition to urea formaldehyde particulate beads.

Such coating composition was prepared in the following manner:

A control prepared for comparison purposes is set forth below:

CONTROL

| | Parts by Weight |
|---|---|
| Alkyd resin* | 3.4 |
| Rin 7069 Lacquer solvent | 0.02 |
| Cobalt drier | 0.03 |
| Carbon black | 0.40 |
| Suspending agent (bentone) | 0.06 |
| Clay (ASP-170) | 4.00 |
| Mineral spirits | 1.36 |

*The alkyd resin employed hereinabove was comprised of a tall oil fatty acid ester, phthalic anhydride, fumaric acid, and glycerine and was reduced to about 36 percent solids with odorless mineral spirits.

This pigment part was ground in a zircoa mill until a Hegman grind gauge reading of about 6.5 was obtained.

This pigment paste was formulated into a coating composition in the following manner:

| | Parts by Weight |
|---|---|
| Alkyd resin (above) | 3.050 |
| Drier — zirconium | 0.025 |
| Drier — manganate tallate | 0.015 |
| Drier — cobalt tallate | 0.015 |
| Anti-skinning agent | 0.010 |
| Pigment paste (above) | 2.635 |
| Mineral spirits | 0.680 |

These components were blended into a homogeneous composition.

COMPOSITION A

In this composition particulate urea formaldehyde beads as prepared in Example I were added to a pigment paste in the following manner:

| | Parts by Weight |
|---|---|
| Alkyd resin (above) | 3.40 |
| Lacquer solvent | 0.02 |
| Cobalt drier | 0.03 |
| Carbon black | 0.40 |
| Suspending agent | 0.06 |
| Particulate beads (Example I) | 2.32 |
| Mineral spirits | 2.04 |

This pigment paste was used in formulating the following coating composition:

| | Parts by Weight |
|---|---|
| Alkyd resin (above) | 3.05 |
| Drier (zirconium) | 0.025 |
| Drier (magnanese tallate) | 0.015 |
| Drier (cobalt tallate) | 0.015 |
| Anti-skinning agent | 0.010 |
| Pigment paste (above) | 4.135 |
| Mineral spirits | 0.340 |

COMPOSITION B

In this composition, particulate urea formaldehyde beads as prepared in Example II were added to a pigment paste in the following manner:

| | Parts by Weight |
|---|---|
| Alkyd resin (above) | 3.40 |
| Lacquer solvent | 0.02 |
| Cobalt drier | 0.03 |
| Carbon black | 0.40 |
| Suspending agent | 0.06 |
| Particulate beads (Example II) | 2.32 |
| Mineral spirits | 2.04 |

This pigment paste was used in formulating the following coating composition:

| | Parts by Weight |
|---|---|
| Alkyd resin (above) | 3.05 |
| Drier (zirconium) | 0.025 |
| Drier (manganese tallate) | 0.015 |
| Drier (cobalt tallate) | 0.015 |
| Anti-skinning agent | 0.010 |
| Pigment paste (above) | 4.135 |
| Mineral spirits | 0.340 |

The flatting efficiency of the particulate urea-formaldehyde beads was compared with that of a conventional flatting pigment, i.e., clay (ASP-170). It will be noted that the clay in the control was replaced in Composition A and Composition B by an equal volume of particulate beads.

The differences are measured by employing a gloss meter and the results are listed below:

| | Angle at Which Gloss was Measured 85° | 60° | 20° |
|---|---|---|---|
| Control | 11 | 2 | 0 |
| Composition A | 1 | 0 | 1 |

|  | Angle at Which Gloss was Measured | | |
|---|---|---|---|
|  | 85° | 60° | 20° |
| Composition B | 9 | 10 | 1 |

The data indicates that the conventional flatting agent could readily be replaced by the particulate beads of the present invention and still have the desired flatting efficiency. It is believed that the particulate beads herein could be prepared by the method of this invention at a cost which would permit commercial sale at a cost which would be substantially less than the cost of most conventional flatting pigment.

EXAMPLE XIII

In this example a control coating composition containing a conventional flatting agent, clay (ASP-170) was replaced by particulate beads as prepared in Example I.

The control composition was similar to that of Example XII except that for ever 100 gallons of the present composition 9.3 gallons (200 pounds) of clay (ASP-170) was incorporated therein.

This clay was replaced in the control composition with the particulate bead from Example I in the following proportions:

|  | Gallons | Weight (lbs.) | Gloss | | |
|---|---|---|---|---|---|
|  |  |  | 20° | 60° | 85° |
| Control (Clay — ASP-170) | 9.3 | 200 | 0 | 1 | 15 |
| Particulate beads (Example I) | 9.3 | 116.3 | 0 | 0 | 0.1 |
|  | 7.8 | 97 | 0 | 0 | 0.1 |
|  | 5.4 | 67.7 | 0 | 0 | 0.1 |
|  | 3.9 | 48.5 | 0 | 1 | 1 |
|  | 2.7 | 33.9 | 1 | 4 | 2 |
|  | 2.1 | 26.6 | 1 | 10 | 6 |
|  | 1.5 | 19.2 | 2 | 18 | 18 |

The data above shows that at an equal volume replacement the particulate beads herein have a superior flatting effect, even though the weight of particulate beads is only slightly more than one-half the weight of the clay.

It will be noted that even at as low as 3.9 gallons (48.5 pounds) per hundred gallons that the particulate beads herein still have a superior flatting effect when compared to the 9.3 gallons (200 pound) per hundred gallons of clay (ASP-170).

This example shows the superior flatting of the particulate beads of the present invention when compared to a conventional flatting agent, either on a volume or weight basis replacement.

EXAMPLE XIV

In this example, the burnish resistance of a conventional latex flat enamel was evaluated before and after removal of silica and aluminum silicate, which was replaced by particulate beads prepared as described in Example II.

The control had the following characteristics:

| | |
|---|---|
| Percent pigment solids | 41.2 |
| Percent vehicle of total solids | 58.8 |
| Percent non-volatile solids | 26.8 |
| Percent volatile solids | 73.2 |
| Vehicle solids: | 100 percent acrylic resin |
| Pigment solids: | 66.3 percent titanium dioxide |
|  | 9.9 percent barium sulfate |
|  | 23.8 percent silica and silicate |
| Total weight solids | 57.0 percent |
| Total volume solids | 37.4 percent |

A Gardner Straight Line Washability and Abrasion Machine was employed to determine the burnish resistance herein. A sponge was wet with about 50 milliliters of water, then about 20 strokes of Lava soap were applied to the sponge. The sponge was then placed in a holder provided for it and 25 cycles were run. Subsequently, the sponge was washed out, squeezed dried and rewet with water. This procedure was repeated until 100 cycles were completed. The burnish resistance is measured by the change in gloss.

For purposes of this test, some of the films were allowed to dry for three days and others were allowed to air dry for 3 days and subsequently force dried for 1 hour at 140° F.

The films were provided from the control above and also by coatings similar to the control but having a portion of the silica and aluminum silicate replaced with the particulate beads (Example II) of the present invention.

The results of the burnish resistance test are set forth in Table II below.

The data from this table would indicate that the particulate beads of the present invention can readily be utilized to replace conventional flatting agents and still provide films having superior burnish resistance as shown by the small change in gloss, even while employing a lesser amount of particulate beads.

TABLE II

| Composition | Submicroscopic Silica | Silica | Aluminum Silicate | Barium Sulfate | Particulate Beads | Burnish Test at 140° | | | Burnish Test Air Dry | | |
|---|---|---|---|---|---|---|---|---|---|---|---|
|  |  |  |  |  |  | 85° Gloss Before | 85° Gloss After | Change in Gloss | 85° Gloss Before | 85° Gloss After | Change in Gloss |
| Control | 10* | 20 | 90 | 50 | 0 | 10,10,10 | 17,18,16 | 7 | 10, 9,10 | 18,20,20 | 9.66 |
| " | 10 | 20 | 90 | 50 | 0 | 10,10,10 | 16,17,16 | 6.5 | 11,10,11 | 20,19,20 | 9.33 |
| " | 10 | 20 | 90 | 50 | 0 | 10,10,10 | 15,15,19 | 6.5 | 10,11,10 | 20,21,20 | 10 |
| A | 10 | 0 | 0 | 50 | 66.8 | 2 | 3 | 1 | 2 | 4 | 2 |
| " | 10 | 0 | 0 | 50 | 66.8 | 2 | 3 | 1 | 2 | 3 | 1 |
| " | 10 | 0 | 0 | 50 | 66.8 | 2 | 3 | 1 | 2 | 3 | 1 |
| B | 10 | 0 | 0 | 50 | 41.8 | 3 | 5 | 2 | 3 | 5 | 2 |

TABLE II-continued

| Composition | Submicroscopic Silica | Silica | Aluminum Silicate | Barium Sulfate | Particulate Beads | Burnish Test at 140° 85° Gloss Before | Burnish Test at 140° 85° Gloss After | Burnish Test at 140° Change in Gloss | Burnish Test Air Dry 85° Gloss Before | Burnish Test Air Dry 85° Gloss After | Burnish Test Air Dry Change in Gloss |
|---|---|---|---|---|---|---|---|---|---|---|---|
| '' | 10 | 0 | 0 | 50 | 41.8 | 3 | 4–5 | 1.5 | 3 | 5 | 2 |
| '' | 10 | 0 | 0 | 50 | 41.8 | 3 | 4 | 1 | 3 | 5 | 2 |
| C | 10 | 0 | 0 | 50 | 16.8 | 6–7 | 10 | 3.5 | 7 | 12 | 5 |
| '' | 10 | 0 | 0 | 50 | 16.8 | 7–8 | 10 | 2.5 | 8–9 | 13 | 4.5 |
| '' | 10 | 0 | 0 | 50 | 16.8 | 7–8 | 9–10 | 2 | 8 | 13 | 5 |

*Pounds per 100 gallons.

EXAMPLES XV–XVI

In these examples the beads were added directly, in slurry form, into an acrylic latex coating composition which was subsequently utilized to coat a substrate.

The following components were charged into a clean container:

|  | Parts by Weight Example XV | Parts by Weight Example XVI |
|---|---|---|
| Water | 150 | 150 |
| Ethylene glycol | 33 | 33 |
| Formaldehyde (37% in water) | 126.5 | 126.5 |
| Urea | 101.65 | 101.65 |
| Polyethylene glycol compound (Carbowax 20M - Union Carbide) | 3.25 | — |
| Carbowax 6,000 (Union Carbide) | — | 3.25 |

These compositions were subjected to high shearing action, as in Example II, for about 10 minutes, then a small amount of defoamer was added. Subsequently, an acid solution, comprising 5.39 parts sulfuric acid and 14.88 parts of water, was added and the agitation was permitted to continue for 30 minutes. Finally 20.0 parts of barium hydroxide octahydrate were added.

These aqueous bead slurries were incorporated directly into an acrylic latex coating composition as follows:

COMPOSITION A

|  | Parts by Weight |
|---|---|
| Example XV (above) | 454.67* |
| Water | 7.4 |
| Thickener (aqueous solution containing 2% hydroxyethyl Cellulose) | 108.0 |
| Surfactant | 40.0 |
| Latex acrylic (Example XIV - control) | 280.0 |

*Approximately

COMPOSITION B

|  | Parts by Weight |
|---|---|
| Example XVI (above) | 454.67 |
| Water | 7.4 |
| Thickener (as above) | 108.0 |
| Surfactant | 40.0 |
| Latex acrylic (Example XIV - control) | 280.0 |

When these compositions were applied to a substrate and dried, they provided films, which at about 2 mils in thickness had good mar and burnish resistance.

It is understood that the examples set forth hereinabove are only illustrative of specific embodiments of the invention and that other components, conditions and percentages may be employed. For example, instead of urea, methylene urea or ethylene urea may be employed or the urea may be partially or entirely replaced with a phenol such as p-ethylenephenol or other p-alkyl phenols. Also, it will be noted that the formaldehyde may be employed in concentrations other than those set forth in the examples. Likewise, other amines may be employed, for example, ethylamine, propylamine, butylamine, triethylamine, morpholine, or the like, may be employed. Other protective colloidforming materials may be employed, such as polyoxyalkylene, polyol esters, ethylene glycol and propylene esters; glycerol esters, methyl glucoside esters, polyglycerol esters and the like may readily be employed in place of polyvinyl alcohol. Likewise, other suitable acid catalysts may be employed. These include phosphoric acid, para-toluene sulfonic acid, hydrochloric acid, formic acid, and the like.

In addition, it will be noted that the particulate beads herein may have incorporated herein pigments such as titanium dioxide silica, carbon black, talc, and the like, as well as surface-active agents, dispersing agents, adhesion enhancing agents, fungicides and the like.

Further, it will be noted that the particulate beads herein may be incorporated into resins other than those shown in the examples, such as acrylic resins, epoxy resins, and the like.

Although specific examples have been set forth hereinabove, it is not intended that the invention be limited solely thereto, but include all the variations and modifications falling within the scope of the appended claims.

We claim:

1. A coating composition comprising a film forming resinous vehicle and incorporated therein agglomerated particulate beads having a gross particle size of from about 1 to about 50 microns in an amount sufficient to have a flatting effect on films of said filmforming material, wherein said beads consist essentially of urea or phenol and formaldehyde prepared by the method comprising:
   A. reacting a urea or a phenol and a formaldehyde, wherein the molar ratio of the urea to the formaldehyde is from about 1:1 to about 3:0.5 and wherein the molar ratio of the phenol to the formaldehyde is from about 1:1 to about 1:3, in a basic aqueous medium to form a prepolymer;
   B. blending said prepolymer with a hydroxyfunctional protective colloid-forming material;
   C. polymerizing the prepolymer by acidifying the mixture thus formed under agitation, thereby forming particulate beads and agglomerating said beads to a gross particle size of from about 1 micron to about 50 microns; and
   D. collecting said urea or phenol-formaldehyde particulate beads.

2. A coating composition as in claim 1 having incorporated therein pigments.

3. A coating composition as in claim 1 wherein said film-forming material is selected from the group consisting of acrylic resins, cellulose derivatives, polyolefin resins, polyamide resins, alkyd resins, and phenolic resins.

4. A coating composition as in claim 1 wherein said film-forming material is linseed alkyd resin modified with diisocyanate.

* * * * *